United States Patent
Chien et al.

(10) Patent No.: US 10,021,793 B2
(45) Date of Patent: Jul. 10, 2018

(54) HEAD-UP DISPLAY AND OPERATION OF OPENING COVER THEREOF

(71) Applicants: LITE-ON ELECTRONICS (GUANGZHOU) LIMITED, Guangzho (CN); LITE-ON TECHNOLOGY CORPORATION, Taipei (TW)

(72) Inventors: Hung-Chang Chien, Taipei (TW); Chia-Hsing Chao, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 206 days.

(21) Appl. No.: 15/252,261

(22) Filed: Aug. 31, 2016

(65) Prior Publication Data
US 2017/0354046 A1 Dec. 7, 2017

(30) Foreign Application Priority Data
Jun. 6, 2016 (CN) .......................... 2016 1 0398437

(51) Int. Cl.
*H05K 5/00* (2006.01)
*B60K 35/00* (2006.01)
*B60R 1/00* (2006.01)
*G02B 27/01* (2006.01)

(52) U.S. Cl.
CPC .......... *H05K 5/0017* (2013.01); *B60K 35/00* (2013.01); *B60R 1/00* (2013.01); *G02B 27/0149* (2013.01); *G02B 27/0179* (2013.01); *B60K 2350/2052* (2013.01); *B60K 2350/406* (2013.01); *B60R 2300/205* (2013.01); *G02B 2027/0154* (2013.01)

(58) Field of Classification Search
CPC .............. H05K 5/0017; G02B 27/0149; G02B 27/0179
See application file for complete search history.

(56) References Cited

U.S. PATENT DOCUMENTS

2017/0113551 A1* 4/2017 Schaellert .............. B60K 35/00

* cited by examiner

*Primary Examiner* — Nam Pham
(74) *Attorney, Agent, or Firm* — McClure, Qualey & Rodack, LLP

(57) ABSTRACT

A head-up display includes a transmission mechanism, a first cover, a second cover and a driver. The first cover is connected to the transmission mechanism and slidable with respect to the transmission mechanism. The second cover is separably connected to the first cover. The driver is configured to drive the transmission mechanism to operate. Wherein during a first state to a second state of the head-up display, the first cover and the second cover are connected to each other and move together in an opening direction; during the second state to a third state of the head-up display, the first cover is separated from the second cover.

10 Claims, 11 Drawing Sheets

HEAD-UP DISPLAY AND OPERATION OF OPENING COVER THEREOF

This application claims the benefit of People's Republic of China application Serial No. 201610398437.4, filed on Jun. 6, 2016, the subject matter of which is incorporated herein by reference.

BACKGROUND

Technical Field

The disclosure relates in general to a head-up display, and more particularly to a head-up display having a cover, and an operation of opening the cover.

Background

Currently, the requirement for vehicle forces on the vehicle interior and safety equipment requirements in addition to performance. These ancillary technologies (such as car voice navigation system, collision voice warning system, etc.) truly reduce the incidence of accident resulted from the fatigue driving in long time, inability to concentrate, etc. However, non-voice warning system is usually disposed on the dashboard, and thus it affects the driving safety when the driver down to watch the dashboard.

Since a car head-up display (HUD) provides the driver with the required driving information in front of the driver, it can prevent the driver from distractingly watching down or turning head, and accordingly it is conducive to driving safety.

However, a screen of the conventional HUD is usually exposed. Over time, the screen is easily damaged by external environment (such as sunlight, dust, etc.), resulting in the HUD is easy to damage or deface.

Thus, it is necessary to provide a new HUD to resolve conventional problems of being easily damaged by external environment.

SUMMARY

According to one embodiment of the disclosure, a head-up display is provided. The head-up display includes a transmission mechanism, a first cover, a second cover and a driver. The first cover is connected to the transmission mechanism and slidable with respect to the transmission mechanism. The second cover is separably connected to the first cover. The driver is configured to drive the transmission mechanism to operate. Wherein during a first state to a second state of the head-up display, the first cover and the second cover are connected to each other and move together in an opening direction; during the second state to a third state of the head-up display, the first cover is separated from the second cover.

The above and other aspects of the disclosure will become better understood with regard to the following detailed description of the preferred but non-limiting embodiment(s). The following description is made with reference to the accompanying drawings.

Figure 1A:
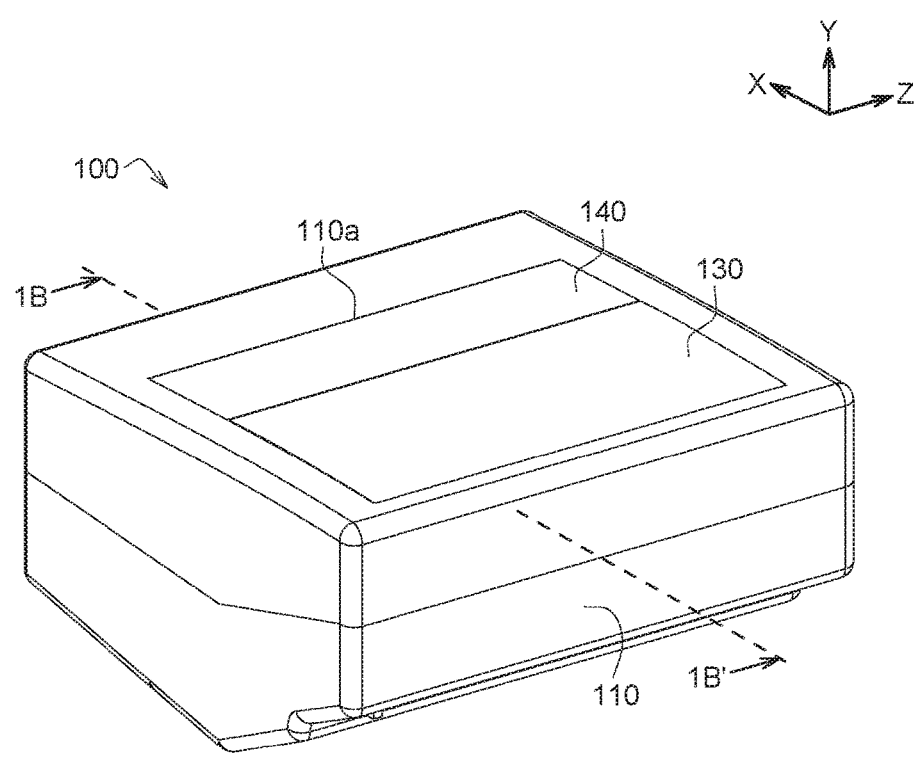
FIG. 1A shows an appearance view of a HUD according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
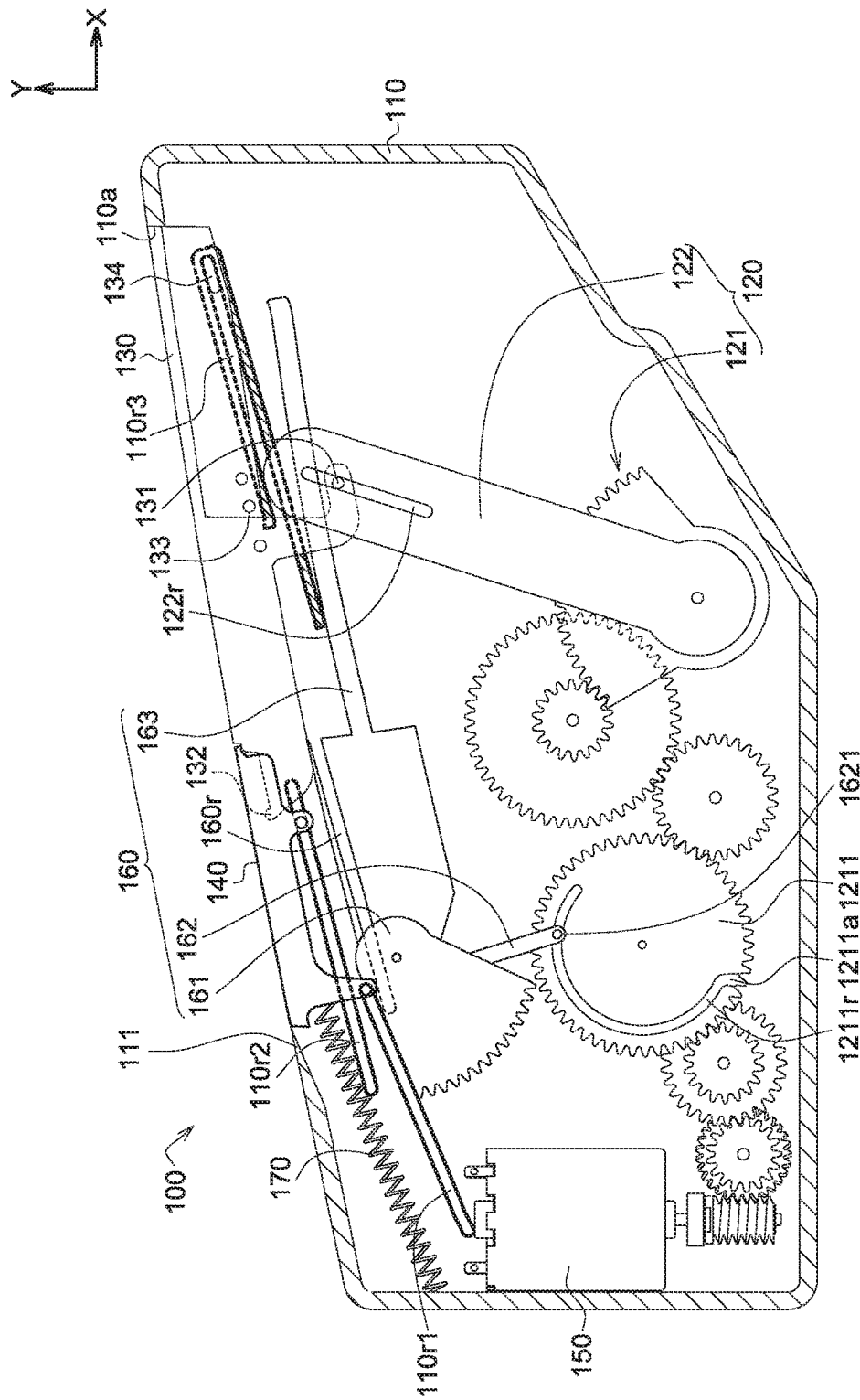
FIG. 1B shows a cross-sectional view of the HUD of FIG. 1A along a direction 1B-1B'.
Figure 1C:
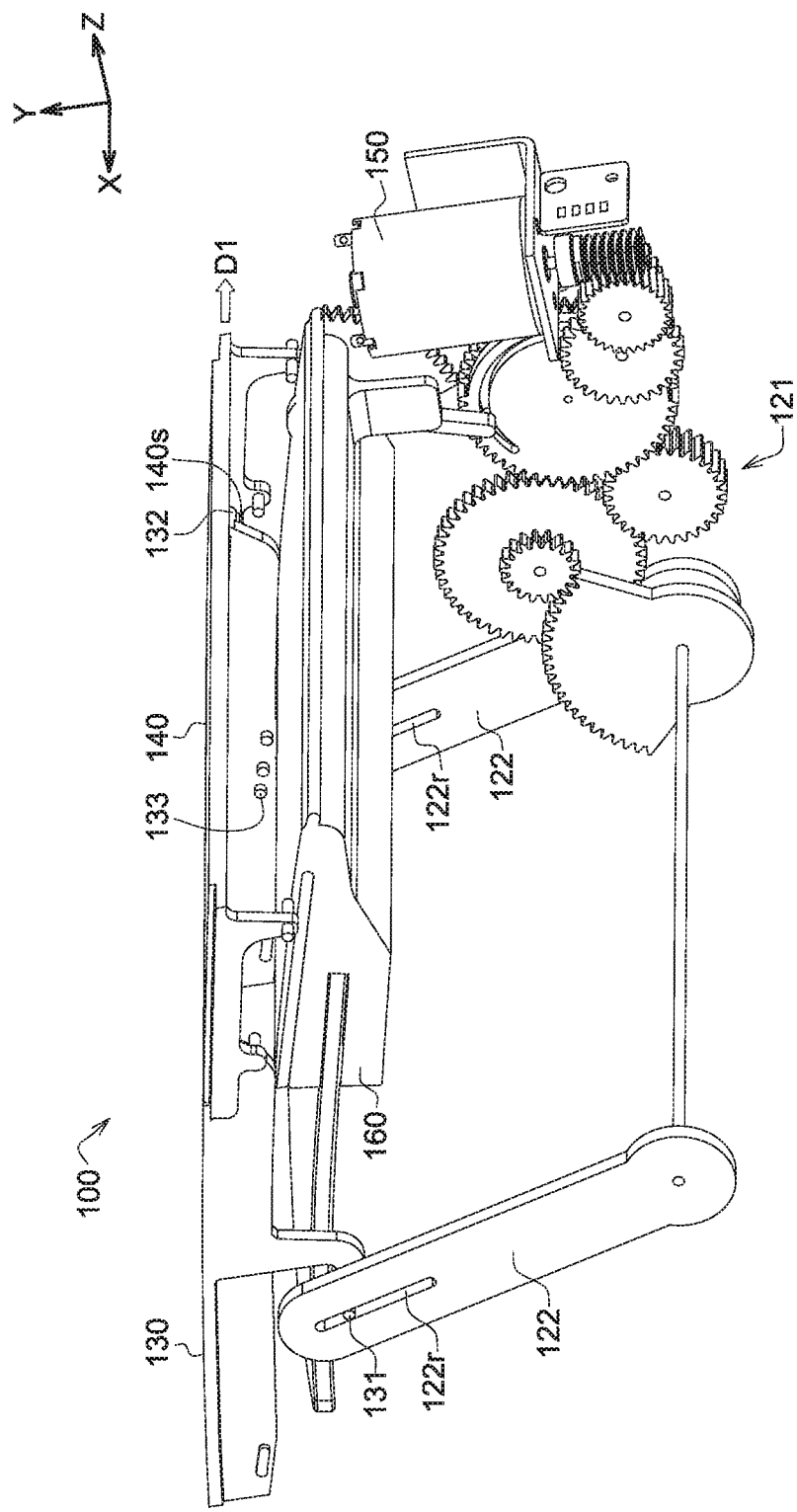
FIG. 1C shows a diagram of the HUD of FIG. 1B in another viewed angle.

Referring to FIGS. 1A, 1B and 1C, FIG. 1A shows an appearance view of a head-up display (HUD) 100 according to an embodiment of the disclosure, FIG. 1B shows a cross-sectional view of the HUD 100 of FIG. 1A along a direction 1B-1B', and FIG. 1C shows a diagram of the HUD 100 of FIG. 1B in another viewed angle.

The HUD 100 includes a casing 110, a transmission mechanism 120, a first cover 130, a second cover 140, a driver 150 and a screen structure 160. The casing 110 includes an opening 110a, and the first cover 130 and the second cover 140 may selectively cover the opening 110a. When the HUD 100 is not in use, the first cover 130 and the second cover 140 cover the opening 110a. When the HUD 100 is operated to project an image, the first cover 130 and the second cover 140 are driven by the transmission mechanism 120 to expose the opening 110a for lifting the screen structure 160 from the opening 110a.

In the present embodiment, the transmission mechanism 120, the first cover 130, the second cover 140, the driver 150 and the screen structure 160 of the HUD 100 are disposed within the casing 110. In addition, the HUD 100 of the present embodiment may be embedded in a vehicle, such as embedded in a front panel of car or dashboard.

In the present embodiment, the first cover 130 and the transmission mechanism 120 are connected to each other and slidable with respect to each other. The second cover 140 is separably connected to the first cover 130. The screen structure 160 is selectively connected to the transmission mechanism 120. The driver 150 may drive the transmission mechanism 120 for driving the HUD 100 to change among a first state, a second state and a third state.

Figure 2:
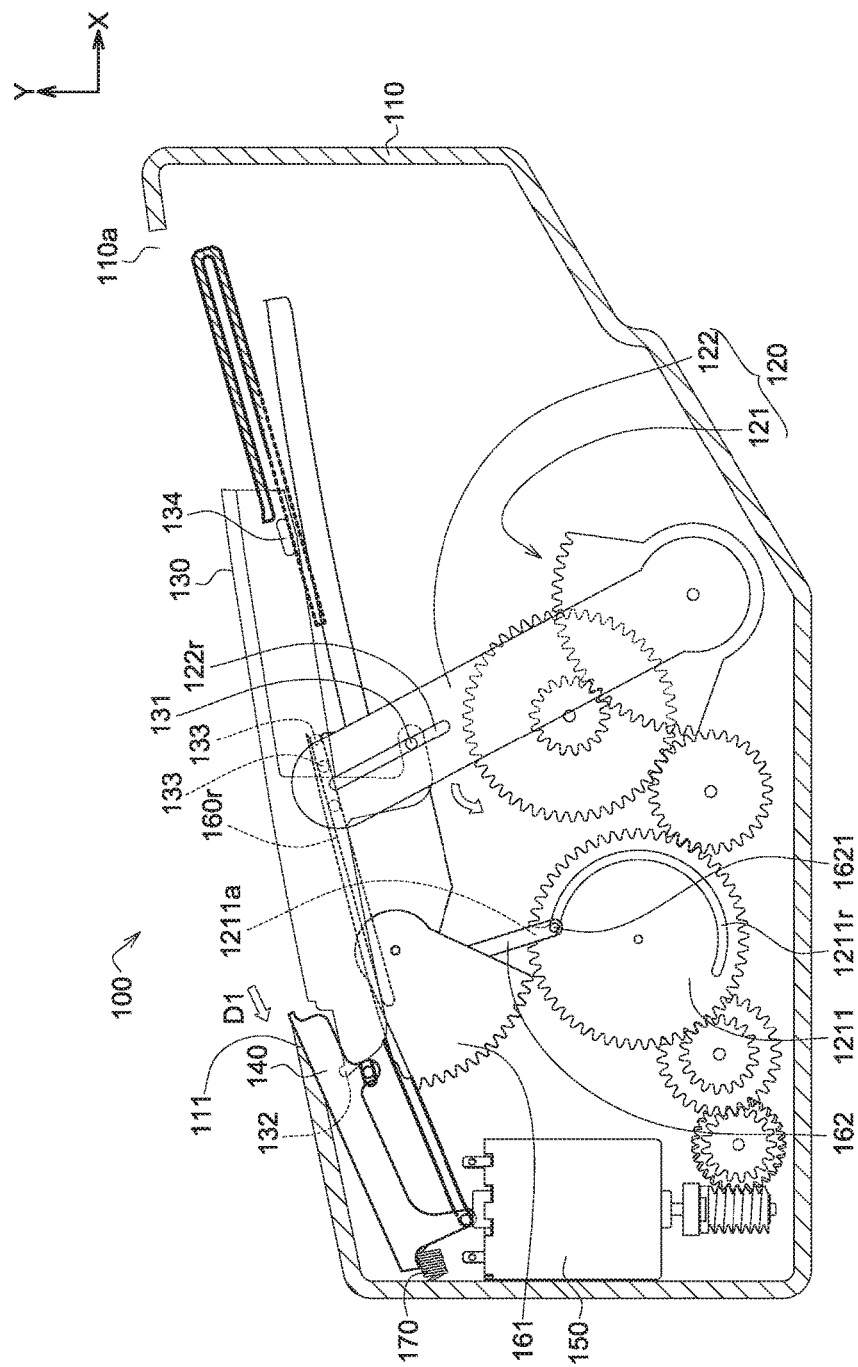
FIG. 2 shows a diagram of the HUD of FIG. 1B being at the second state.
Figure 4:
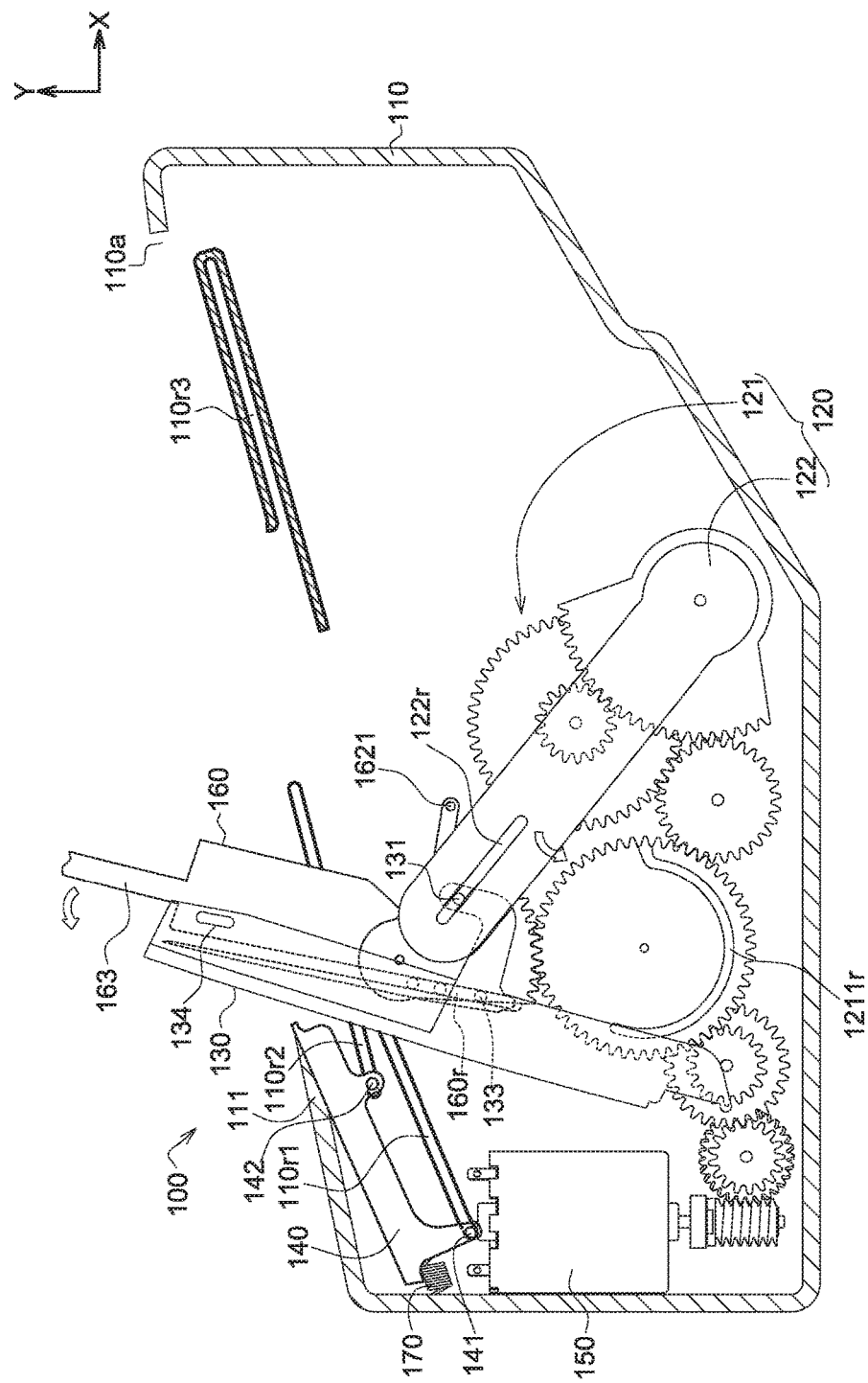
FIG. 4 shows a diagram of the HUD of FIG. 1B being at the third state.

FIGS. 1A to 1C show a diagram of the HUD 100 being at the first state. FIG. 2 shows a diagram of the HUD 100 of FIG. 1B being at the second state. FIG. 4 shows a diagram of the HUD 100 of FIG. 1B being at the third state.

In the present embodiment, when the HUD 100 is at the first state, as shown in FIG. 1B, the first cover 130 and the second cover 140 cover the opening 110*a*. When the HUD 100 is at the second state, as shown in FIG. 2, the second cover 140 moves to an inside of the casing 110, and the first cover 130 covers a portion of the opening 110*a*. When the HUD 100 is at the third state, as shown in FIG. 4, the first cover 130 and the second cover 140 are separated from each other, and at least a portion of the first cover 130 moves to the inside of the casing 110.

During the first state to the second state, the first cover 130 and the second cover 140 are connected to each other, and under the driving of the driver 150, the first cover 130 and the second cover 140 may move together in an opening direction D1. During the second state to the third state, the first cover 130 and the second cover 140 are separated from each other, such that the first cover 130 moves with respect to the second cover 140.

As shown in FIG. 1B, the transmission mechanism 120 includes a gear assembly 121 and a swing rod 122. The swing rod 122 is connected to the gear assembly 121 and driven by the gear assembly 121 to rotate. The driver 150 may drive the gear assembly 121 to operate for driving the swing rod 122 to rotate. The screen structure 160 may be rotatably disposed within the casing 110 and includes a first gear 161, a couple linkage 162 and a screen 163, wherein the first gear 161, the couple linkage 162 and the screen 163 are fixed to one another. In other words, when the screen structure 160 rotates, the first gear 161, the couple linkage 162 and the screen 163 may move together without relative motion. The screen 163 is, for example, a semi-transmissive coating a plastic sheet or a glass sheet, and it may receive an image from the optical modules and project a virtual image.

The gear assembly 121 of the transmission mechanism 120 includes a second gear 1211 including a third guiding groove 1211*r*. The couple linkage 162 of the screen structure 160 has a connecting pin 1621 at one end of the couple linkage 162, and the connecting pin 1621 is separably disposed within the third guiding groove 1211*r*. In the present embodiment, when the HUD 100 is at the first state, the connecting pin 1621 of the couple linkage 162 is located at the third guiding groove 1211*r*, and the first gear 161 of the screen structure 160 is not engaged with the second gear 1211, as shown in FIG. 1B. During the first state to the second state, the connecting pin 1621 of the couple linkage 162 slides in the third guiding groove 1211*r* of the second gear 1211, and the first gear 161 and the second gear 1211 maintain the state of not engaging.

In detail, the third guiding groove 1211*r* includes an arc guiding groove having a contact radius of curvature, and a center of curvature substantially located at a rotating center of the second gear 1211. During the first state to the second state, since the arc guiding groove of third guiding groove 1211*r* has the contact radius of curvature and the center of curvature substantially located at the rotating center of the second gear 1211, the connecting pin 1621 of the couple linkage 162 relatively slides in the arc guiding groove of the third guiding groove 1211*r* when the second gear 1211 is driven by the driver 150 to rotate. Therefore, the second gear 1211 can't drive the screen structure 160 to rotate, and the second gear 1211 and the first gear 161 maintain the state of not engaging during the first state to the second state. In other words, the screen structure 160 maintains being at the original position.

As shown in FIG. 1B, the third guiding groove 1211*r* further includes an open end part 1211*a* connected to a side of the arc guiding groove of the third guiding groove 1211*r*. The open end part 1211*a* extends from the side of the arc guiding groove of the third guiding groove 1211*r* to a gear profile surface of the second gear 1211, such that the connecting pin 1621 of the couple linkage 162 may enter or escape from the third guiding groove 1211*r* of the second gear 1211 through the exposed open end part 1211*a*. During the first state to the second state, the connecting pin 1621 of the couple linkage 162 relatively slides in the arc guiding groove of the third guiding groove 1211*r*, and moves to a connection between the arc guiding groove and the open end part 1211*a*. In other words, when HUD 100 is at the second state, the connecting pin 1621 of the couple linkage 162 is located at the connection between the arc guiding groove of the third guiding groove 1211*r* and the open end part 1211*a*, as shown in FIG. 2.

In the present embodiment, the first cover 130 and the transmission mechanism 120 are connected to each other and slidable with respect to each other. As shown in FIG. 1B, the first cover 130 and the swing rod 122 of the transmission mechanism 120 are connected to each other and slidable with respect to each other. For example, the swing rod 122 includes a second guiding groove 122*r*, and the first cover 130 includes a second connecting portion 131, wherein the second connecting portion 131 is slidably disposed within the second guiding groove 122*r*, such that the first cover 130 and the swing rod 122 are connected to each other and slidable with respect to each other. During the first state to the second state, the second connecting portion 131 relatively slides in the second guiding groove 122*r*.

In the present embodiment, the second cover 140 is separably connected to the first cover 130. In the present embodiment, as shown in FIGS. 1B and 1C, the HUD 100 further includes an elastic element 170, the first cover 130 includes a protrusion 132, and the second cover 140 includes a wall surface 140*s*. In the present embodiment, the second cover 140 and the first cover 130 are separably connected to each other through the relationship among the elastic element 170, the protrusion 132 and the wall surface 140*s*. In detail, the elastic element 170 is connected to the second cover 140 and provides the second cover 140 with an elastic force, such that the wall surface 140*s* of the second cover 140 and the protrusion 132 of the first cover 130 press against each other. As shown in FIG. 1B, when the HUD 100 is at the first state, the elastic element 170 is stretched and provides the second cover 140 with the elastic force, such that the second cover 140 tends to moving toward the opening direction D1. However, as this time, the second cover 140 can't move toward the opening direction D1 due to the second cover 140 being restricted by the protrusion 132 of the first cover 130.

According to the present embodiment, during the first state to the second state, the swing rod 122 is driven by the gear assembly 121 and the driver 150 to rotate and drives the first cover 130 to move toward the opening direction D1 by the connection between the second guiding groove 122*r* of the swing rod 122 and the second connecting portion 131 of the first cover 130. During the first cover 130 moving toward the opening direction D1, the wall surface 140*s* of the second cover 140 maintains pressing against the protrusion 132 of the first cover 130 such that the second cover 140 moves in the opening direction D1 due to the elastic force of the elastic element 170 applying to the second cover 140. In one embodiment, as shown in FIG. 1B, the elastic element 170 may be connected between the second cover 140 and the casing 110. When the HUD 100 is at the first state, the elastic element 170 stores an elastic potential, and accordingly the elastic element 170 may provide the second cover 140 with an elastic restoring force when the first cover 130 moves toward the opening direction D1. The elastic restoring force is, for example, a pulling force toward the open direction D1 to drive the second cover 140 moves toward the opening direction D1.

In the present embodiment, as shown in FIG. 1B, the first cover 130 further includes a first connecting portion 133, and the screen structure 160 further includes a first guiding groove 160r. The first guiding groove 160 is corresponding to the first connecting portion 133 of the first cover 130 and is separably connected to the first connecting portion 133. When the HUD 100 is at the first state, the first connecting portion 133 of the first cover 130 is separated from the first guiding groove 160r of the screen structure 160, that is, the first connecting portion 133 has not yet entered the first guiding groove 160r, and accordingly the screen structure 160 and the first cover 130 do not move together. During the first state to the second state, when the first cover 130 is driven by the swing rod 122 to move toward the opening direction D1, the first connecting portion 133 of the first cover 130 enters the first guiding groove 160r of the screen structure 160, such that the first cover 130 is connected to the screen structure 160, as shown in FIG. 2.

As shown in FIG. 2, when the HUD 100 is at second state, the second cover 140 moves to the inside of the casing 110, and the first cover 130 still covers a portion of the opening 110a. At this time, the elastic element 170 is return to a free state, that is, the elastic element 170 does not provide the second cover 140 with the elastic restoring force. In addition, the first connecting portion 133 of the first cover 130 enters the first guiding groove 160r of the screen structure 160, such that the first cover 130 and the screen structure 160 are connected to each other, the connecting pin 1621 of the couple linkage 162 of the screen structure 160 is located at the connection between the arc guiding groove and the open end part 1211a, and the first gear 161 and the second gear 1211 are in the state of not engaging.

Figure 3A:
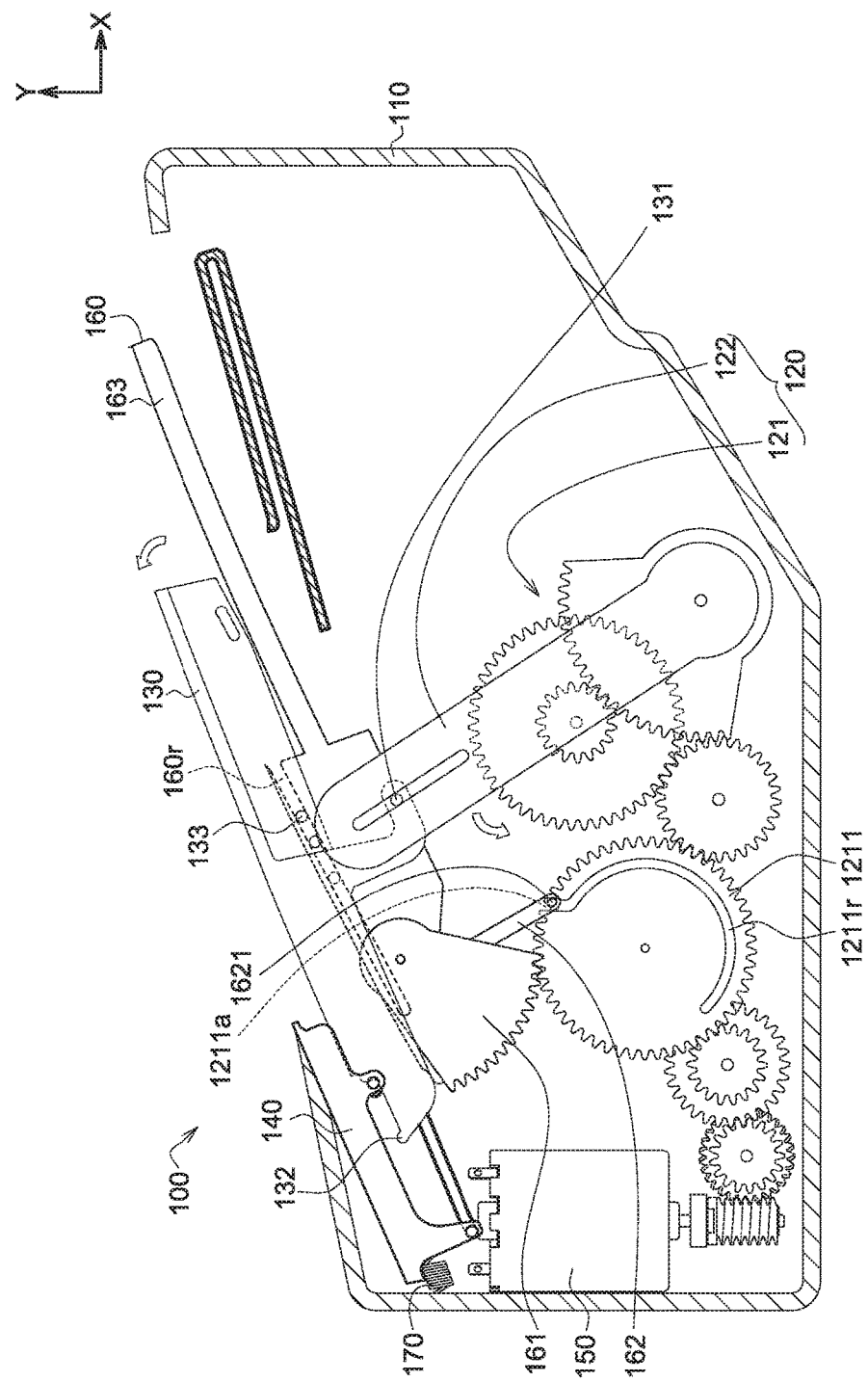
FIG. 3A shows a diagram of the HUD of FIG. 2 being in a middle position between the second state and the third state.
Figure 3B:
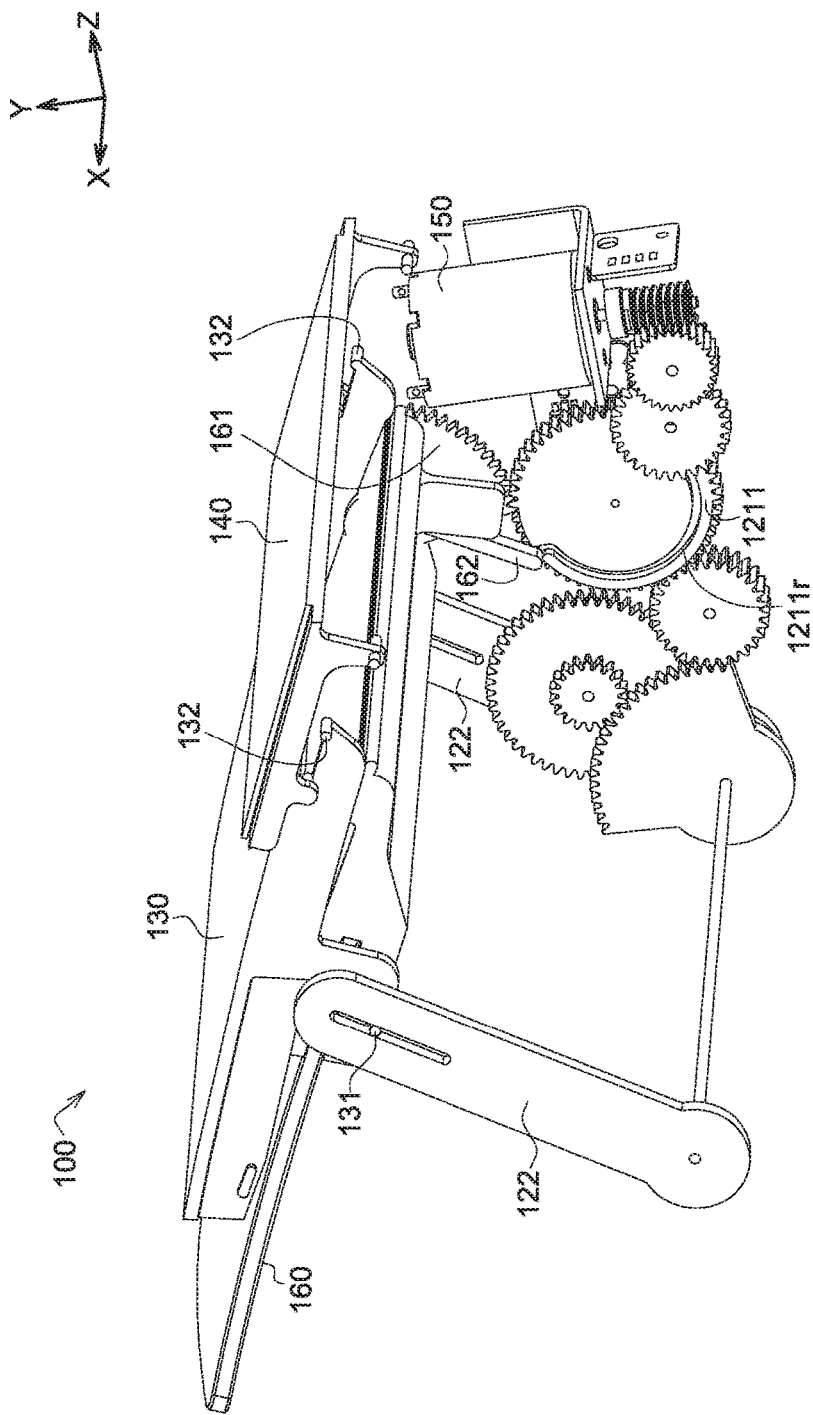
FIG. 3B shows a diagram of the HUD of FIG. 3A in another viewed angle.

As shown in FIGS. 3A, 3B and 4, FIG. 3A shows a diagram of the HUD 100 of FIG. 2 being in a middle position between the second state and the third state, and FIG. 3B shows a diagram of the HUD 100 of FIG. 3A in another viewed angle.

Then, when the driver 150 continues to operate, the HUD 100 changes to the third state from the second state. As shown in FIGS. 3A and 3B, during the second state to the third state, the connecting pin 1621 of the $>_5$ couple linkage 162 enters the open end part 1211a of the third guiding groove 1211r and then is driven by the open end part 1211a of the third guiding groove 1211r to rotate the screen structure 160, such that the first gear 161 and the second gear 1211 are engaged with each other. During the screen structure 160 rotating, due to the first connecting portion 133 of the first cover 130 and the first guiding groove 160r of the screen structure 160 are connected to each other, the first guiding groove 160r of the screen structure 160 may guide the first cover 130 to rotate together, such that the first cover 130 and the second cover 140 are separated from each other, that is, the protrusion 132 of the first cover 130 is separated from the wall surface 140s (the wall surface 140s is shown in FIG. 1C) of the second cover 140.

Then, when the driver 150 continues to operate, the connecting pin 1621 of the couple linkage 162 is separated from the third guiding groove 1211r of the second gear 1211 from the open end part 1211a of the third guiding groove 1211r. Besides, the screen structure 160 changes to be connected to the transmission mechanism 120 by the engagement between the first gear 161 and the second gear 1211. Then, the driver 150 continues to drive the screen structure 160 to rotate by the engagement between the first gear 161 and the second gear 1211, such that the screen 163 of the screen structure 160 is lifted until the screen 163 of the screen structure 160 is at an operative state, as shown in FIG. 4. Such operative state means an optical module (no shown) of the HUD 100 may project an image on the screen 163 to show the user the image. The image is such as car speed, a tire pressure or other driving information. At this time, the HUD 100 is at the third state.

In addition, during the second state to the third state, as shown in FIGS. 3A and 4, the swing rod 122 is also driven by the driver 150 and the gear assembly 121 to rotate and then continues to drive the first cover 130 by the connection between the second guiding groove 122r of the swing rod 122 and the second connecting portion 131 of the first cover 130, such that the first connecting portion 133 of the first cover 130 moves in the first guiding groove 160r of the screen structure 160. In the present embodiment, as shown in FIGS. 3A and 4, since the first guiding groove 160r of the screen structure 160 rotates together with the screen structure 160, the first cover 130 also rotates by the guiding of the first guiding groove 160r and moves toward the inside of the casing 110. In other words, due to the driving of the swing rod 122 and the guiding of the first guiding groove 160r of the screen structure 160, the first cover 130 moves to the inside of the casing 110.

In the present embodiment, as shown in FIGS. 1B and 4, the casing 110 further includes a fourth guiding groove 110r1 and a fifth guiding groove 110r2, and the second cover 140 further includes a third connecting portion 141 and a fourth connecting portion 142, wherein the third connecting portion 141 is slidably disposed in the fourth guiding groove 110r1, and the fourth connecting portion 142 is slidably disposed in the fifth guiding groove 110r2. During the first state to the second state, when the second cover 140 moves by the elastic force of the elastic element 170, the second cover 140 may steadily slide through the guiding of the fourth guiding groove 110r1 and the fifth guiding groove 110r2 and move toward a predetermined direction.

In addition, in the present embodiment, as shown in FIG. 1B, the fourth guiding groove 110r1 and the fifth guiding groove 110r2 are straight grooves which are not parallel to each other. When the second cover 140 moves by the elastic force of the elastic element 170, the second cover 140 inclines by an angle through the guiding of the fourth guiding groove 110r1 and the fifth guiding groove 110r2 and moves toward the inside of the casing 110 along the fourth guiding groove 110r1 and the fifth guiding groove 110r2, as shown in FIG. 2. In the present embodiment, during the first state to the second state, since the second cover 140 rotate to avoid an edge portion 111 of the casing 110, it can prevents the second cover 140 from being interfered with the edge portion 111 when the second cover 140 moves toward the inside of the casing 110. The edge portion 111 is the edge of the opening 111a.

In the present embodiment, the fourth guiding groove 110r1 and the fifth guiding groove 110r2 are not limited to the straight grooves which are not parallel to each other. In other embodiment, the fourth guiding groove 110r1 and the fifth guiding groove 110r2 may be two arc grooves, or one is the straight groove and another is the arc groove. The fourth guiding groove 110r1 and the fifth guiding groove 110r2 may be designed according to the practice situation, only if the second cover 140 can move in a predetermined path to prevent from being interfered with the casing 110 for making the second cover 140 successfully move to the inside of the casing 110.

In the present embodiment, as shown in FIGS. 1B and 4, the casing 110 further includes a sixth guiding groove 110r3, and the first cover 130 further includes a fifth connecting portion 134. During the first state to the second state, as shown in FIGS. 1B and 2, the fifth connecting portion 134 slides in the sixth guiding groove 110r3, such that the first cover 130 steadily slides by the guiding of the sixth guiding groove 110r3. When the HUD 100 is at the second state, as shown in FIG. 2, the first connecting portion 133 of the first cover 130 enters the first guiding groove 160r of the screen structure 160, and the fifth connecting portion 134 of the first cover 130 is separated from the sixth guiding groove 110r3 of the casing 110, such that the first cover 130 moves together with the first guiding groove 160r.

As described above, according to the embodiment(s) of the present disclosure, when the HUD 100 is at the first state, the first cover 130 and the second are connected to each other and cover the opening 110a. At this time, the screen structure 160 is connected to the transmission mechanism 120 through the couple linkage 162. During the first state to the second state, under the driving of the driver 150, the transmission mechanism 120 drives the first cover 130 to move, such that the second cover 140 moves together with the first cover 130 to expose the opening 110a. In addition, under the guiding of guiding groove, the second cover 140 may rotate to avoid the edge portion 111 of the casing 110 and then moves toward the inside of the casing 110. Furthermore, during the first state to the second state, the transmission mechanism 120 does not drive the screen structure 160 to move. In other words, the screen structure 160 maintains being at original position.

When the HUD 100 is at the second state, at least one portion of the second cover 140 moves to the inside of the casing 110, the first cover 130 still covers a portion of the opening 110a, and the screen structure 160 maintains being the original position. Then, during the second state to the third state, the driver 150 drives the transmission mechanism 120, such the transmission mechanism 120 drives the first cover 130 to continues to move and be separated from the second cover 140. In addition, under the guiding of the guiding groove, the first cover 130 may rotate and move toward the inside of the casing 110. In above embodiment, the guiding groove is the first guiding groove 160r of the screen structure 160. Furthermore, during the second state to the third state, the couple linkage 162 of the screen structure 160 is separated from the transmission mechanism 120, and the screen structure 160 is connected to the transmission mechanism 120 through the first gear 161. The transmission mechanism 120 drives the first gear 161, such that the screen 163 of the screen structure 160 is lifted to be at the operative state.

When the HUD 100 is at the third state, the first cover 130 is separated from the second cover 140 and moves to the inside of the casing 110, and the screen 163 of the screen structure 160 is at the operative state. In addition, when the HUD 100 is at the third state, the transmission mechanism 120 may reversely drive the transmission mechanism 120 to drive the above components to move in a reverse processes, such that the screen structure 160 is received within the casing 110, the first cover 130 and the second cover 140 cover the opening 110a, and thus the HUD 100 returns back the first state.

According to the HUD of the present embodiment(s) of this disclosure, since a cover is divided into the first cover and the second cover to cover the opening of the casing, and the first cover and the second cover move to the inside of the casing in different positions for exposing the opening of the casing, the HUD can have a larger opening for lifting the screen structure under the limiting inside space of the casing, and accordingly it is not necessary to narrow the size of the opening resulted from the inside space being not insufficient to the moving of the cover or it can prevent the cover from exposing any portion of the opening resulted from the need for reducing the size of the cover.

Figure 5:
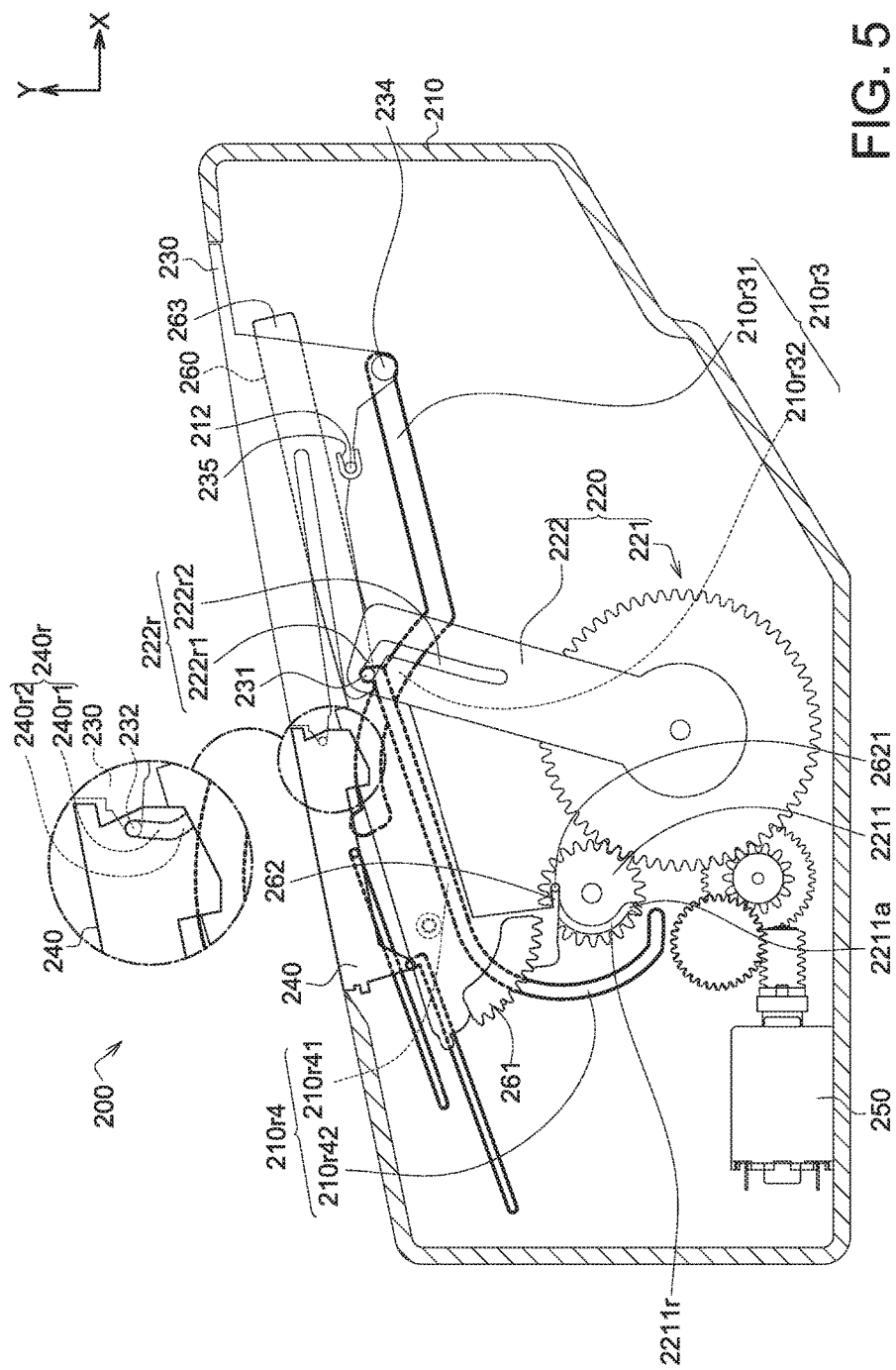
FIG. 5 shows a cross-sectional view of a HUD according to another embodiment.

FIG. 5 shows a cross-sectional view of a HUD 200 according to another embodiment. The HUD 200 includes a casing 210, a transmission mechanism 220, a first cover 230, a second cover 240, a driver 250 and a screen structure 260.

Similar to the above embodiment, in the present embodiment, the first cover 230 and the transmission mechanism 220 are connected to each other and slidable with respect to each other. The second cover 240 is separably connected to the first cover 230. The screen structure 260 is selectively connected to the transmission mechanism 220. The driver 250 may drive the transmission mechanism 220 for driving the HUD 200 to change among the first state, the second state and the third state. The HUD 200 of FIG. 5 is at the first state.

Similar to the above embodiment, in the present embodiment, the transmission mechanism 220 includes a gear assembly 221 and a swing rod 222. The swing rod 222 is connected to the gear assembly 221. The driver 250 drives the gear assembly 221 to operate for driving the swing rod 222 to rotate. The screen structure 260 includes a first gear 261, a couple linkage 262 and a screen 263, wherein the first gear 261, the couple linkage 262 and the screen 263 are fixed to one another.

Similar to the above embodiment, in the present embodiment, the gear assembly 221 of the transmission mechanism 220 includes a second gear 2211. The second gear 2211 includes a third guiding groove 2211r including an open end part 2211a connected to a side of the arc guiding groove of the third guiding groove 2211r. The couple linkage 262 of the screen structure 260 has a connecting pin 2621 at one end of the couple linkage 262, and the connecting pin 2621 is separably disposed within the third guiding groove 2211r. In the present embodiment, the connection relationship and the action between the screen structure 260 and the transmission mechanism 220 are similar to the above embodiments, and the similarities are not repeated here.

Similar to the above embodiment, in the present embodiment, the first cover 230 and the transmission mechanism 220 are connected to each other and slidable with respect to each other. For example, the swing rod 222 includes a second guiding groove 222r, and the first cover 230 includes a second connecting portion 231, wherein the second connecting portion 231 is slidably disposed within the second guiding groove 222r, such that the first cover 230 and the swing rod 222 are connected to each other. During the HUD 200 changing among the first state, the second state and the third state, the second connecting portion 231 and the second guiding groove 222r relatively slide.

The present embodiment is different from the above embodiment in that the connection between the first cover 230 and the second cover 240 and the way of driving the first cover 230 and the second cover 240 to rotate and move. In the present embodiment, the first cover 230 and the second cover 240 are separably connected to each other through the protrusion 232 of the first cover 230 and a connecting groove 240r of the second cover 240, and the first cover 230 rotate and move by the guiding of the guiding groove disposed on the casing 210, rather than the guiding groove disposed on the screen structure 260 in above embodiment.

In the present embodiment, the second guiding groove 222r of the transmission mechanism 220 includes a first segment 222r1 and a second segment 222r2 connected to the first segment 222r1. The casing 210 includes a sixth guiding groove 210r3, wherein the sixth guiding groove 210r3 includes a fifth segment 210r31 and a sixth segment 210r32 connected to the fifth segment 210r31. The first cover 230 includes a fifth connecting portion 234, wherein the fifth connecting portion 234 is slidably disposed within the sixth guiding groove 210r3 of the casing 210. Furthermore, the connecting groove 240r of the second cover 240 includes a ninth segment 240r1 and a tenth segment 240r2 connected to the ninth segment 240r1.

Figure 6:
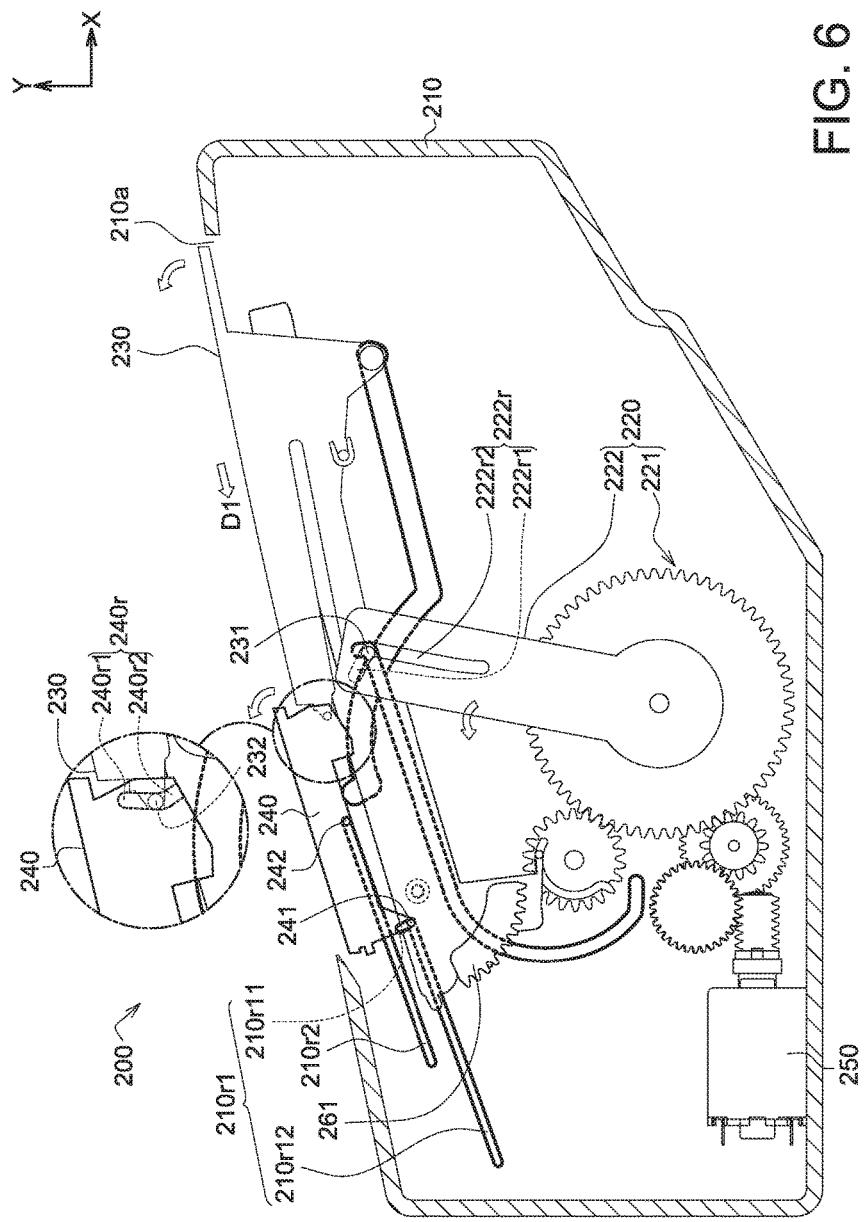
FIG. 6 shows a diagram of the HUD of FIG. 5 being at a preceding stroke between the first state and the second state.

As shown in FIGS. 5 and 6, FIG. 6 shows a diagram of the HUD 200 of FIG. 5 being at a preceding stroke between the first state and the second state. In the preceding stroke, the first cover 230 and the second cover 240 are inclined by an angle before the first cover 230 and the second cover 240 are driven to move toward the opening direction D1, such that the first cover 230 and the second cover 240 avoid the edge of the opening 210a, as shown in FIG. 6, and accordingly it can prevent the first cover 230 and the second cover 240 from being interfered with the edge of the opening 210a during the first cover 230 and the second cover 140 move toward the inside of the casing 210.

In detail, under the driving of the driver 250, the gear assembly 221 drives the swing rod 222 to rotate and guides the first cover 230 to incline by an angle by the design of the first segment 222r1 of the second guiding groove 222r. During the first cover 230 inclining, as shown in FIG. 6, the protrusion 232 of the first cover 230 relatively moves in the ninth segment 240r1 of the connecting groove 240r to drive the second cover 240 to incline due to the connection between the protrusion 232 of the first cover 230 and the ninth segment 240r1 of the connecting groove 240r. When the preceding stroke completes, as shown in FIG. 6, the second connecting portion 231 of the first cover 230 is located at the connection between the first segment 222r1 and the second segment 222r2 of the second guiding groove 222r. The protrusion 232 of the first cover 230 is located at the connection between the ninth segment 240r1 and the tenth segment 240r2 of the connecting groove 240r.

Figure 7:
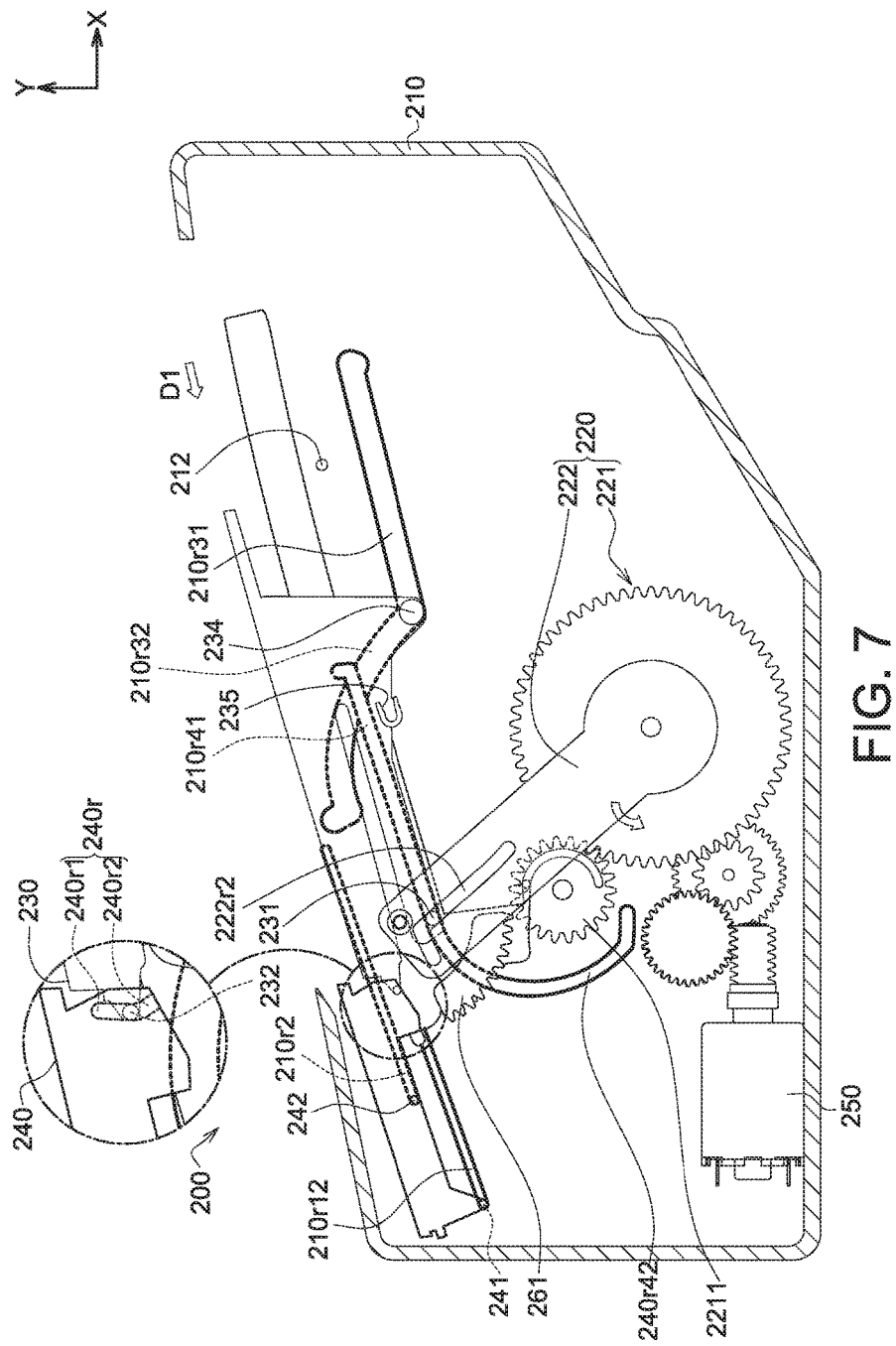
FIG. 7 shows a diagram of the HUD of FIG. 5 being at the second state.

As shown in FIGS. 6 and 7, FIG. 7 shows a diagram of the HUD 200 of FIG. 5 being at the second state. Under the continuous driving of the driver 250, the swing rod 222 continues to rotate and drive the second connecting portion 231 of the first cover 230 to move by the second segment 222r2 of the second guiding groove 222r, such that the fifth connecting portion 234 of the first cover 230 slides in the fifth segment 210r31 of the sixth guiding groove 210r3. At this time, the second connecting portion 231 of the first cover 230 also moves in the second segment 222r2 of the second guiding groove 222r. During such process, the first cover 230 moves to the position as shown in FIG. 7 by the driving of the second segment 222r2 of the second guiding groove 222r and the guiding of the fifth segment 210r31 of the sixth guiding groove 210r3. In the present embodiment, the fifth segment 210r31 of the sixth guiding groove 210r3 is a straight groove for guiding the first cover 230 to move toward the opening direction D1. In addition, due to the protrusion 232 of the first cover 230 being connected to the connecting groove 240r of the second cover 240, during the first cover 230 moving, the first cover 230 drives the second cover 240 to move to the inside of the casing 210, as shown in FIG. 7. Furthermore, when the HUD 200 is at the second state, the fifth connecting portion 234 of the first cover 230 is located at the connection between the fifth segment 210r31 and the sixth guiding groove 210r3 of the sixth guiding groove 210r3.

Figure 8:
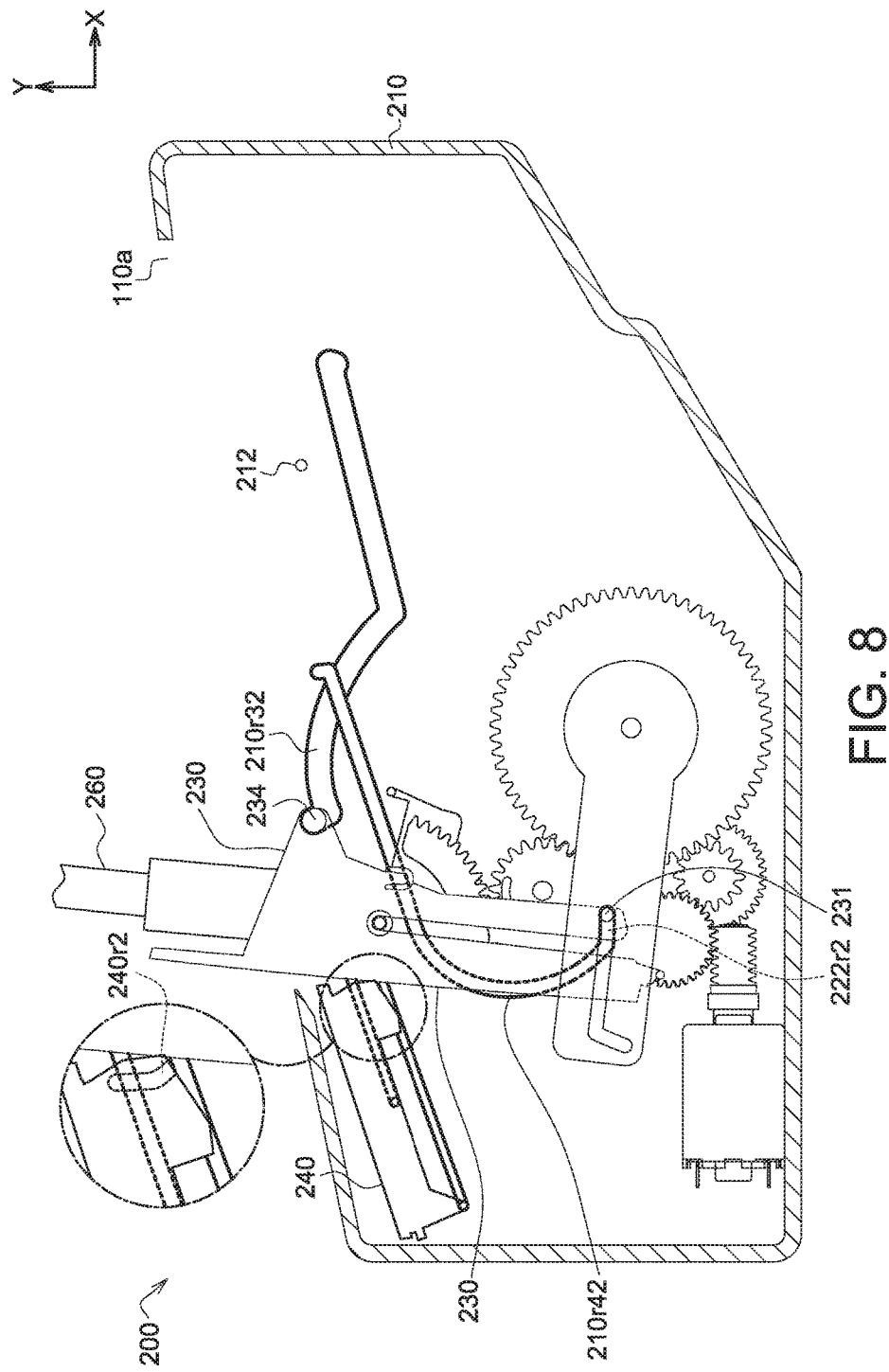
FIG. 8 shows a diagram of the HUD of FIG. 5 being at the third state.

FIG. 8 shows a diagram of the HUD 200 of FIG. 5 being at the third state. Under the driving of the driver 250, the swing rod 222 continues to rotate and drive the second connecting portion 231 of the first cover 230 to move by the second segment 222r2 of the second guiding groove 222r, such that the fifth connecting portion 234 of the first cover 230 slides in the sixth segment 210r32 of the sixth guiding groove 210r3. At this time, the second connecting portion 231 of the first cover 230 also relatively slides in the second segment 222r2 of the second guiding groove 222r. During this process, the first cover 230 is guided to rotate. In the present embodiment, the sixth segment 210r32 of the sixth guiding groove 210r3 is an arc groove for guiding the first cover 230 to rotate. When the first cover 230 rotates, the protrusion 232 of the first cover 230 moves in the tenth guiding groove 240r2 of the connecting groove 240r of the second cover 240 and is, then, separated from the connecting groove 240r for preventing the first cover 230 from being interfering with the second cover 240 due to the rotating of the first cover 230 or preventing the second cover 240 from stopping the first cover 230 rotating.

In the present embodiment, as shown in FIG. 5, the casing 210 further includes a seventh guiding groove 210r4, wherein the seventh guiding groove 210r4 includes a third segment 210r41 and a fourth segment 210r42 connected to the third segment 210r41. In the present embodiment, the second connecting portion 231 of the first cover 230 is not only slidably disposed within the second guiding groove 222r of the swing rod 222, but also slidably disposed within the seventh guiding groove 210r4 of the casing 210. During the first state to the second state, the swing rod 222 drives the second connecting portion 231 of the first cover 230 slides in the third segment 210r41 of the seventh guiding groove 210r4 by the second segment 222r2 of the second guiding groove 222r. When the HUD 200 is at the second state, the second connecting portion 231 of the first cover 230 is located at the connection between the third segment 210r41 and the fourth segment 210r42 of the seventh guiding groove 210r4. During the second state to the third state, the swing rod 222 drives the second connecting portion 231 of the first cover 230 slides in the fourth segment 210r42 of the seventh guiding groove 210r4 by the second segment 222r2 of the second guiding groove 222r.

In the present embodiment, the third segment 210r41 of the seventh guiding groove 210r4 is a straight groove for guiding the first cover 230 to move toward the opening direction D1. The fourth segment 210r42 of the seventh guiding groove 210r4 is an arc groove for guiding the first cover 230 to rotate. In the present embodiment, the first cover 230 is guided by the sixth segment 210r32 of the sixth guiding groove 210r3 and the fourth segment 210r42 of the seventh guiding groove 210r4 to rotate. Since the first cover 230 are simultaneously guided by the sixth guiding groove 210r3 and the seventh guiding groove 210r4 to move and rotate, the first cover 230 may much steadily move and rotate. In particular, in an embodiment, the third segment 210r41 of the seventh guiding groove 210r4 and the fifth segment 210r31 of the sixth guiding groove 210r3 may be straight grooves parallel to each other for steadily guiding the first cover 230 to move toward the opening direction D1.

Similar to the HUD 100 as mentioned above, during the second state to the third state, the first gear 261 of the HUD 200 is engaged with the second gear 2211, such that the second gear 2211 drives the screen structure 260 to rotate until the screen 263 is lifted to the operative state.

As shown in FIGS. 5 and 6, the casing 210 further includes a first pivoting portion 212, and the first cover 230 further includes a second pivoting portion 235. The first pivoting portion 212 is separably connected to the second pivoting portion 235. In the preceding stroke as shown in FIGS. 5 and 6, the first pivoting portion 212 is pivotal connected to the second pivoting portion 235, and the first cover 230 rotates around the first pivoting portion 212 serving as a fulcrum. As a result, the first cover 230 may much steadily rotate in the preceding stroke. In the present embodiment, the first pivoting portion 212 is, for example, a pivot, and the second pivoting portion 235 is, for example, a recess. In another embodiment, the first pivoting portion 212 may be the recess, and the second pivoting portion 235 may be the pivot.

As shown in FIGS. 5 and 6, the casing 210 further includes a fourth guiding groove 210r1 and a fifth guiding groove 210r2, and the second cover 240 includes a third connecting portion 241 and a fourth connecting portion 242, wherein the third connecting portion 241 is slidably disposed in the fourth guiding groove 210r1, and the fourth connecting portion 242 is slidably disposed in the fifth guiding groove 210r2. The fourth guiding groove 210r1 includes a seventh segment 210r11 and an eighth segment 210r12 connected to the seventh segment 210r11. In the preceding stroke as shown in FIGS. 5 and 6, when the protrusion 232 of the first cover 230 relatively slides in the ninth segment 240r1 of the connecting groove 240r and drives the second cover 240 to rotate, the fourth connecting portion 242 is served as a fulcrum by the second cover 240, and the third connecting portion 241 may slide in the seventh segment 210r11 of the fourth guiding groove 210r1 for providing the second cover 240 with a rotating stroke.

Then, during the first cover 230 driving the second cover 240 to move to the inside of the casing 210 through the connection between the protrusion 232 and the connecting groove 240r of the second cover 240, the third connecting portion 241 of the second cover 240 may slide in the eighth segment 210r12 of the fourth guiding groove 210r1 and the fourth connecting portion 242 of the second cover 240 may slide in the fifth guiding groove 210r2 for guiding the second cover 240 to move with respect to the casing 210. In addition, the fourth guiding groove 210r1 and the eighth segment 210r12 of the fifth guiding groove 210r2 have the geometric designs similar to that of the fourth guiding groove 110r1 and the fifth guiding groove 110r2, and the similarities are repeated.

As described above, the first cover and the second cover of the HUD of the present embodiment may open or close under the driving of the driver. The HUD may change among the first state, the second state and the third state. During the first state to the second state, the first cover is connected to the second cover for moving together to expose the opening of the casing. During the second state to the third state, the first cover is separated from the second cover for exposing the opening of the casing. In an embodiment, during the first state to the second state, the first cover is moved to connect to the screen structure, and during the second state to the third state, the first cover is connected to the screen structure, such that the first cover rotates through the guiding groove of the screen structure during the screen structure being lifted. In another embodiment, during the first state to the third state, the first cover and the screen structure are not connected to each other, under such design, the first cover rotates through the guiding of the guiding groove of the casing.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A head-up display, comprising:
   a casing having an opening;
   a transmission mechanism;
   a screen structure connected to the transmission mechanism and configured to be driven by the transmission mechanism to rotate;
   a first cover connected to the transmission mechanism and being slidable with respect to the transmission mechanism;
   a second cover separably connected to the first cover; and
   a driver configured to drive the transmission mechanism to operate;
   wherein during a first state to a second state of the head-up display, the first cover and the second cover are connected to each other and move together in the opening direction;
   during the second state to a third state of the head-up display, the first cover is separated from the second cover.

2. The head-up display according to claim 1, wherein when the head-up display is at the first state, the first cover and the second cover cover the opening; when the head-up display is at the second state, the first cover covers a portion of the opening, and the second cover is located within the casing; when the head-up display is at the third state, the first cover is separated from the second cover.

3. The head-up display according to claim 1, wherein the transmission mechanism comprises a swing rod comprising a second guiding groove, the first cover comprises a second connecting portion slidably disposed within the second guiding groove;
   wherein the driver is configured to drive the swing rod to rotate, the swing rod drives the first cover to move by a connection between the second guiding groove and the second connecting portion.

4. The head-up display according to claim 3, wherein second guiding groove comprises a first segment and a second segment connected to the first segment;
   wherein before the swing rod drives the first cover to move toward the opening direction, the second guiding groove drives the second connecting portion of the first cover through the first segment and guides the first cover to incline by an angle.

5. The head-up display according to claim 1, wherein the first cover comprises a protrusion, and the second cover comprises a wall surface; during the first state to the second state, the wall surface and the protrusion press against each other; during the second state to the third state, the protrusion is separated from the wall surface.

6. The head-up display according to claim 5, further comprises:
   an elastic element connected to the second cover and configured to provide the second cover with an elastic force, such that the wall surface and the protrusion press against each other.

7. The head-up display according to claim 1, wherein the second cover comprises a connecting groove, and the first cover comprises a protrusion separably disposed within the connecting groove; during the first state to the second state, the protrusion is connected to the connecting groove; during the second state to the third state, the protrusion is separated from the connecting groove.

8. The head-up display according to claim 1, further comprises:
   wherein the first cover comprises a first connecting portion, and the screen structure comprises a first guiding groove; at the first state, the first connecting portion is separated from the first guiding groove; during the first state to the second state, the first cover is moved to connect the first connecting portion to the first guiding groove; during the second state to the third state, the first connecting portion is connected to the first sliding groove, and the first guiding groove of the screen structure guides the first cover to rotate by rotating of the screen structure, such that the first cover is separated from the second cover.

9. The head-up display according to claim 1, wherein the casing comprises a sixth guiding groove and a seventh guiding groove, the first cover comprises a fifth connecting portion and a second connecting portion, and the fifth connecting portion and the second connecting portion slidably disposed within the sixth guiding groove and the seventh guiding groove respectively; each of the sixth guiding groove and the seventh guiding groove has an arc groove; during the second state to the third state, the fifth connecting portion and the second connecting portion slide in the arc groove of the sixth guiding groove and the arc groove of the seventh guiding groove respectively, and the first cover is guided to rotate by the arc grooves, such that the first cover is separated from and the second cover.

10. The head-up display according to claim 1, further comprises:
   a screen structure selectively connected to the transmission mechanism;
   wherein the screen structure comprises a first gear and a couple linkage; the transmission mechanism comprises a second gear; during the first state to the second state, the couple linkage is connected to the second gear, and the second gear is separated from the first gear; during the second state to the third state, the couple linkage is separated from the second gear, and the first gear is engaged with the second gear.

* * * * *